US007494362B2

(12) United States Patent
Dieterle et al.

(10) Patent No.: US 7,494,362 B2
(45) Date of Patent: Feb. 24, 2009

(54) HIGH CURRENT SEALED CONNECTOR PLUG ASSEMBLY

(75) Inventors: Derrick Dieterle, Brighton, MI (US); Ralph Erskine, Dearborn Heights, MI (US); Ping Chen, Novi, MI (US)

(73) Assignee: J.S.T. Corporation, Farmington Hills, MI (US)

( * ) Notice: Subject to any disclaimer, the term of this patent is extended or adjusted under 35 U.S.C. 154(b) by 4 days.

(21) Appl. No.: 11/790,533

(22) Filed: Apr. 26, 2007

(65) Prior Publication Data
US 2008/0268695 A1    Oct. 30, 2008

(51) Int. Cl.
*H01R 13/627* (2006.01)
(52) U.S. Cl. ..................................... 439/352
(58) Field of Classification Search ................ 439/352, 439/271, 345, 321
See application file for complete search history.

(56) References Cited

U.S. PATENT DOCUMENTS

| | | | | |
|---|---|---|---|---|
| 2,649,300 | A | * | 8/1953 | Launder ................. 192/142 R |
| 2,731,610 | A | * | 1/1956 | Thacker ..................... 439/321 |
| 2,917,724 | A | * | 12/1959 | Jackson ..................... 439/721 |
| 4,070,080 | A | * | 1/1978 | Eshleman et al. ........... 439/345 |
| 4,310,211 | A | | 1/1982 | Bunnell et al. |
| 4,472,611 | A | | 9/1984 | Schoch |
| 4,552,425 | A | | 11/1985 | Billman |
| 4,653,826 | A | | 3/1987 | Burgess et al. |
| 4,818,237 | A | | 4/1989 | Weber |
| 4,946,407 | A | | 8/1990 | Young |
| 5,044,970 | A | | 9/1991 | Reuter |
| 5,098,310 | A | * | 3/1992 | Avramovich et al. ........ 439/282 |
| 5,127,836 | A | | 7/1992 | Reuter |
| 5,397,253 | A | | 3/1995 | Fries |
| 5,403,199 | A | | 4/1995 | Mobley et al. |
| 5,959,848 | A | | 9/1999 | Groves et al. |
| 6,024,589 | A | | 2/2000 | Hahn, IV et al. |
| 6,159,057 | A | | 12/2000 | Bernardini |
| 6,352,444 | B1 | * | 3/2002 | Yuzawa ..................... 439/353 |
| 6,621,688 | B1 | | 9/2003 | Burdick |
| 7,175,459 | B2 | * | 2/2007 | Milner et al. ............... 439/271 |

* cited by examiner

*Primary Examiner*—Jean F Duverne
(74) *Attorney, Agent, or Firm*—Rader, Fishman & Grauer, PLLC

(57) ABSTRACT

A connector plug assembly includes a body member, a first threaded shaft portion, a second threaded shaft portion, an electrically-conductive inner sleeve and an electrically-insulative outer sleeve. The body member extends along and about a longitudinal axis and has a first body member end surface, an opposite second body member end surface and an outer surface disposed between the first and second body member end surfaces. The first threaded shaft portion projects from the first body member end surface and the second threaded shaft portion projects from the second body member end surface. The first and second threaded shafts extend along and about the longitudinal axis. The inner sleeve extends along and about the longitudinal axis and the inner sleeve is connected to and surrounds the body member. The outer sleeve extends along and about the longitudinal axis and the outer sleeve is connected to and surrounds the inner sleeve.

31 Claims, 14 Drawing Sheets

US 7,494,362 B2
1

HIGH CURRENT SEALED CONNECTOR PLUG ASSEMBLY

FIELD OF THE INVENTION

The present invention relates to a connector plug assembly. More particularly, the present invention is directed to a high current sealed connector plug assembly.

BACKGROUND OF THE INVENTION

As shown in FIG. 1, a conventional electric motor unit 2 has a casing 4 that houses an electric motor (not shown). A conventional electric motor unit 2 manufactured by an original equipment manufacturer requires some assembly when delivered to a customer. For example, such assembly might include connecting internal high current electrical wires 6a-c to external high current electrical wires 8a-c through a connector structure 10. The connector structure 10 includes a base 12 that holds three (3) terminal connectors 14a-c.

With reference to FIGS. 1 and 2, respective ones of flat terminal ends 6a1-c1 of the internal high current electrical wires 6a-c are fastened to respective ones of the terminal connectors 14a-c by fasteners such as bolts 16a-c and nuts 18a-c. The connector structure 10 can then fastened to the housing 4 by screws 20a-b. Thereafter, respective ones of flat terminal ends 8a1-c1 of the external high current electrical wires 8a-c are fastened to respective ones of the terminal connectors 14a-c by fasteners such as bolts 22a-c and nuts 24a-c.

Such assembly is time-consuming. Also, care must be taken when shipping the conventional electric motor unit 2 to assure that damage does not occur to the internal high current electrical wires 6a-c.

To reduce assembly time and to eliminate the need to protect the internal high current electrical wires 6a-c during shipping, one manufacturer now provides a terminal structure 26 inside the casing 4 of the electric motor unit 2 as shown in FIG. 3. The terminal structure 26 is rigidly attached inside the casing 4. Although not shown, one of ordinary skill in the art would appreciate that there are three terminal structures 26 positioned about the casing 4 and that the one terminal structure 26 shown is by way of example only. The terminal structure 26 includes a washer-like electrode 28 stacked on top of a conventional terminal structure nut 30. The washer-like electrode 28 and the conventional terminal structure nut 30 are secured and nestled in a cup-shaped holder 32 fabricated from an electrically-insulative material such as resin or plastic. The washer-like electrode 28 is connected to one of the internal high current electrical wires 6a-c.

It would be advantageous to provide a high current sealed connector plug assembly that could easily and simply be connected to a terminal structure mounted inside a casing of an electric motor unit. It would also be advantageous to provide a high current sealed connector plug assembly that, once connected to the terminal structure, could be easily connected to the external high current electrical wires. The present invention provides these advantages.

SUMMARY OF THE INVENTION

A connector plug assembly of the present invention includes a body member, a first threaded shaft portion, a second threaded shaft portion, an electrically-conductive inner sleeve and an electrically-insulative outer sleeve. The body member extends along and about a longitudinal axis and has a first body member end surface, an opposite second body member end surface and an outer surface disposed between the first and second body member end surfaces. The first threaded shaft portion projects from the first body member end surface and the second threaded shaft portion projects from the second body member end surface. The first and second threaded shafts extend along and about the longitudinal axis. The electrically-conductive inner sleeve extends along and about the longitudinal axis and the inner sleeve is connected to and surrounds the body member. The electrically-insulative outer sleeve extends along and about the longitudinal axis and the outer sleeve is connected to and surrounds the inner sleeve.

DETAILED DESCRIPTION OF THE EXEMPLARY EMBODIMENTS

Figure 1:
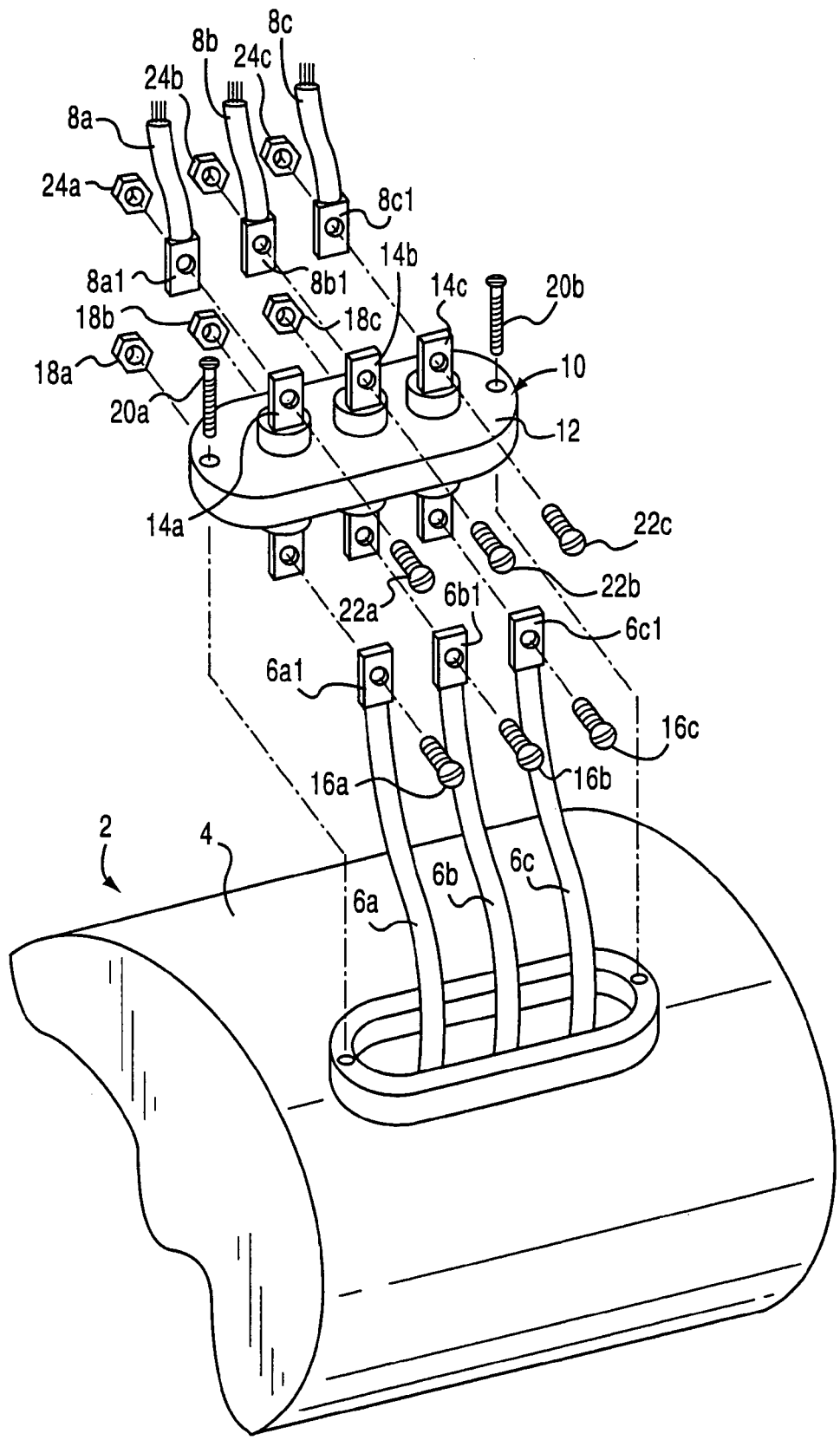
FIG. 1 is a partial exploded perspective view of a conventional connector structure for connecting internal high current electrical wires with external high current electrical wires for a conventional electric motor unit.
Figure 2:
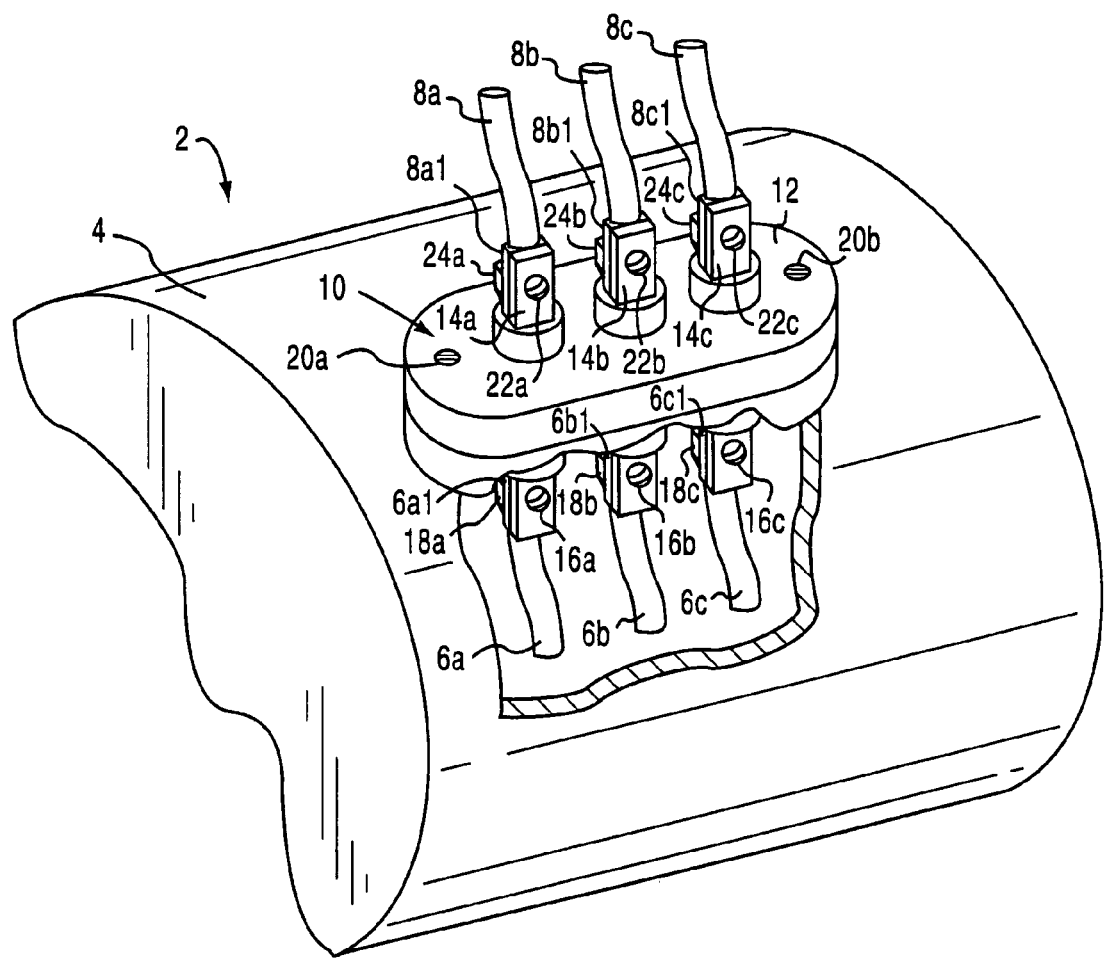
FIG. 2 is a partial exploded perspective view of the conventional connector structure shown in FIG. 1 with the internal high current electrical wires and the external high current electrical wires connected together.
Figure 3:
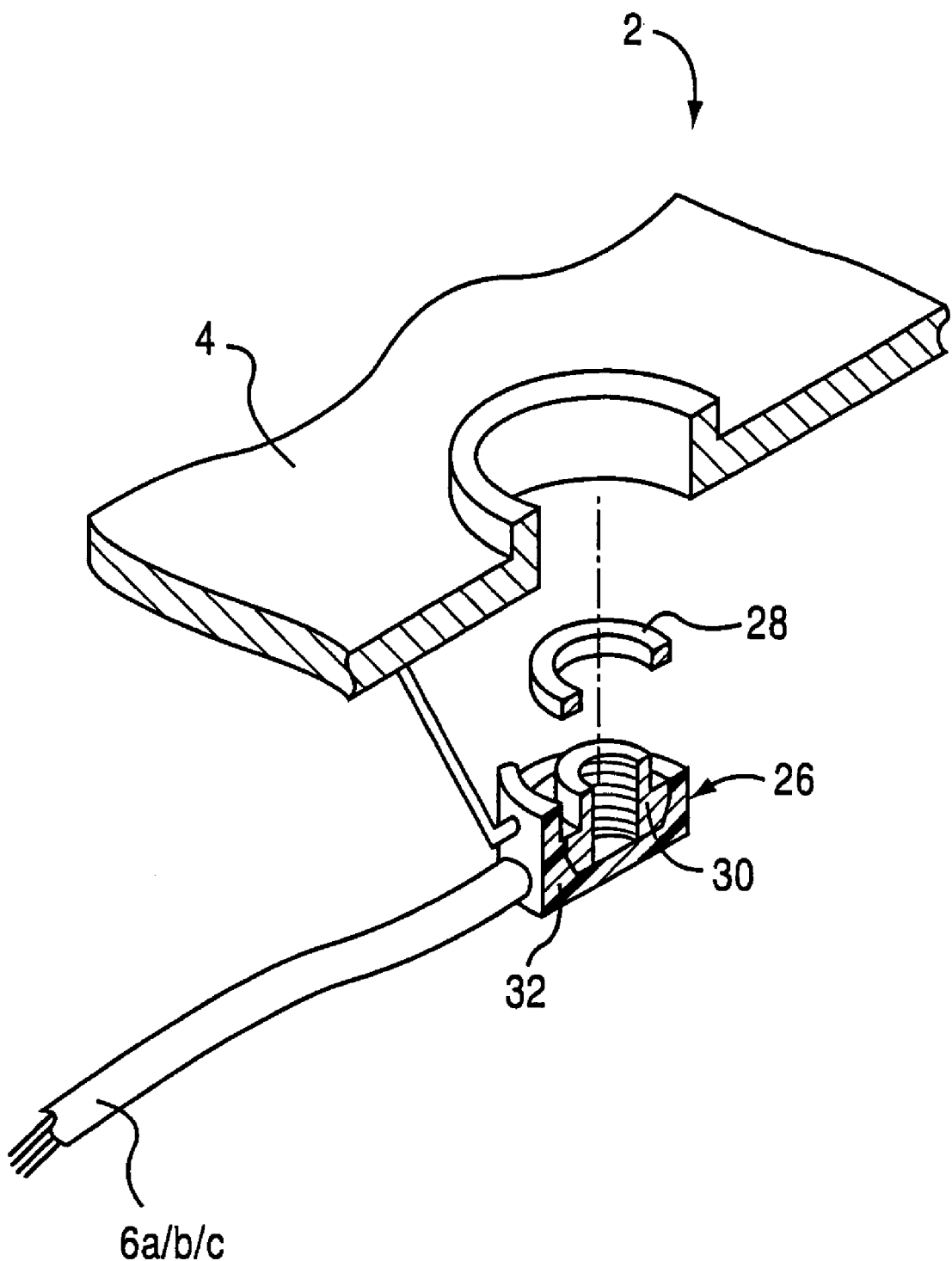
FIG. 3 is a partial exploded perspective view of a conventional terminal structure attached internally within a casing of the conventional electric motor unit.

Hereinafter, embodiments of the present invention will be described with reference to the attached drawings. The structural components common to those of the prior art and the structural components common to respective embodiments of the present invention will be represented by the same symbols and repeated description thereof will be omitted. Furthermore, the reference to terms such as "top", "bottom" and the like are used to simplify the detailed description of the invention for its understanding and should not be construed as limiting in any manner. It is believe that using terms such as "first", "second" or the like in lieu of the terms used herein such as "top", "bottom" and the like obfuscate the description of the invention. The terms such as "top", "bottom" and the like should be construed with the orientation of the invention components as the invention components appear on the drawing figures only and not in free space.

A first exemplary embodiment of a high current sealed connector plug assembly 40 (hereinafter referred to as "connector plug assembly 40") of the present invention is hereinafter described with reference to FIGS. 4-12. As best shown in FIGS. 4-8, the connector plug assembly 40 includes a body member 42, a first threaded shaft portion 44, a second threaded shaft portion 46, an electrically-conductive inner sleeve 48 and an electrically-insulative outer sleeve 50.

The body member 42 extends along and about a longitudinal axis L and has a first body member end surface 42a and an opposite second body member end surface 42b and an outer surface 42c disposed between the first and second body member end surfaces 42a and 42b respectively.

Figure 5:
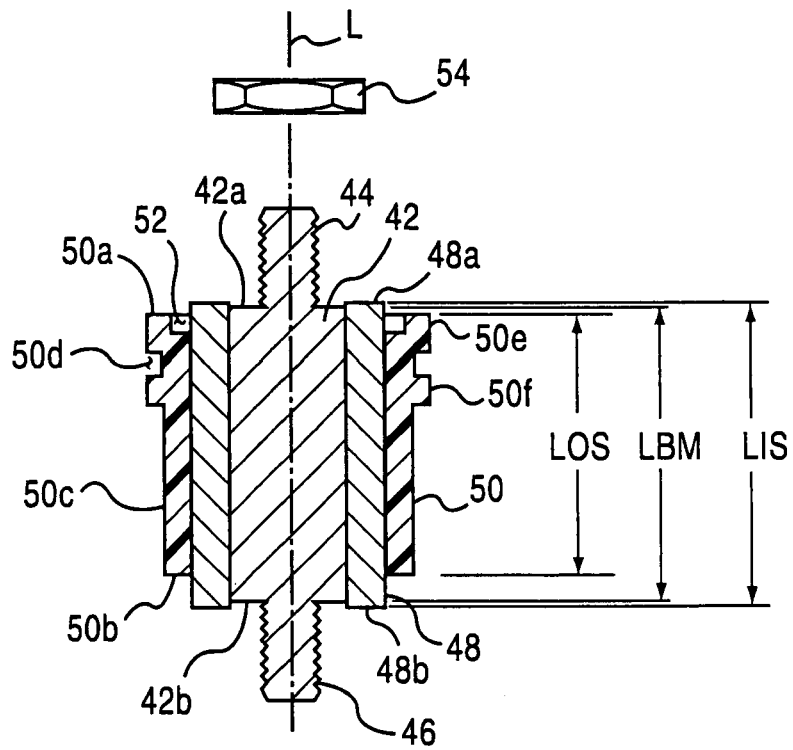
FIG. 5 is a cross-sectional view partially exploded of the connector plug assembly shown in FIG. 4.
Figure 9:
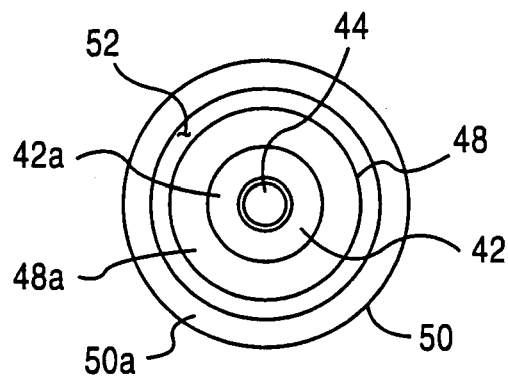
FIG. 9 is a top plan view of the connector plug assembly shown in FIG. 4.
Figure 10:
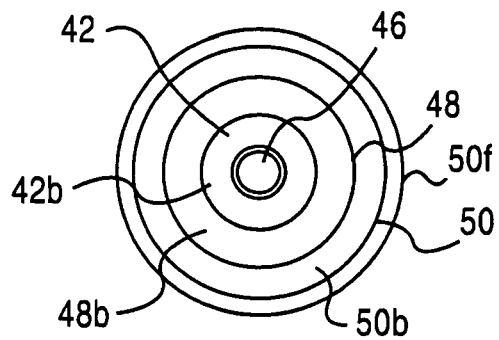
FIG. 10 is a bottom plan view of the connector plug assembly shown in FIG. 4.
Figure 6:
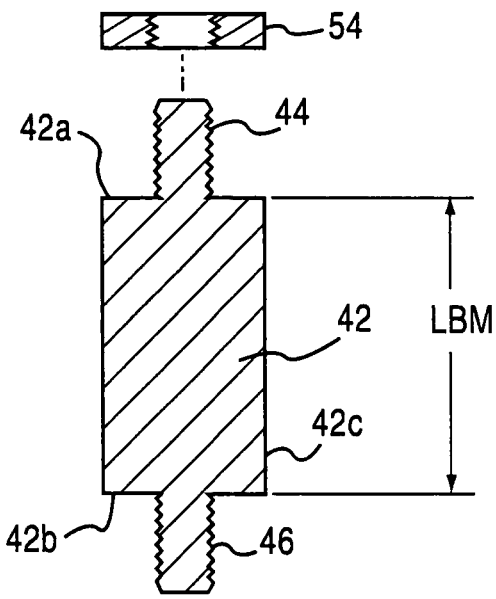
FIG. 6 is a cross-sectional view of a threaded nut and a body member with threaded shafts integrally connected thereto of the connector plug assembly shown in FIG. 4.
Figure 7:
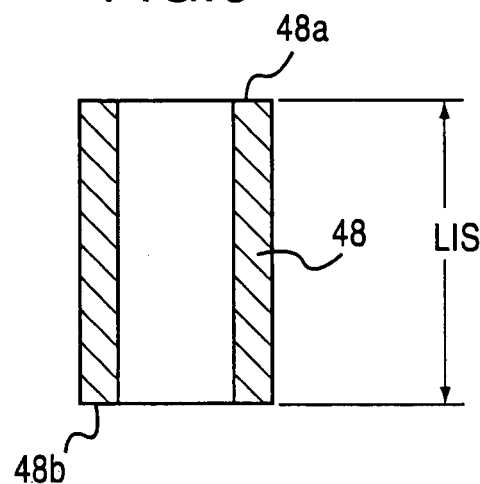
FIG. 7 is a cross-sectional view an inner sleeve of the connector plug assembly shown in FIG. 4.

As best shown in FIGS. 5 and 6, the first threaded shaft portion 44 projects from the first body member end surface 42a and the second threaded shaft portion 46 projects from the second body member end surface 42b. The first and second threaded shaft portions 44 and 46 extend along and about the longitudinal axis L. The electrically-conductive inner sleeve 48 extends along and about the longitudinal axis L and is connected to and surrounds the body member 42. The electrically-insulative outer sleeve 50 extends along and about the longitudinal axis L and is connected to and surrounds the inner sleeve 48.

With reference to FIGS. 5-8, the body member 42 has a body member length LBM that extends longitudinally between the first and second body member end surfaces 42a and 42b respectively. The inner sleeve 48 has an inner sleeve length LIS that extends longitudinally. The outer sleeve 50 has an outer sleeve length LOS that extends longitudinally. In FIG. 5, note that the inner sleeve length LIS is longer than both the body member length LBM and the outer sleeve length LOS.

As best shown in FIGS. 5, 7, 9 and 10, the inner sleeve 48 has a first inner sleeve annular end surface 48a and an opposite second inner sleeve annular end surface 48b. The inner sleeve length LIS extends between the first and second inner sleeve annular end surfaces 48a and 48b respectively. As best shown in FIGS. 5, 8, 9 and 10, the outer sleeve 50 has a first outer sleeve annular end surface 50a and an opposite second outer sleeve annular end surface 50b. The outer sleeve length LOS extends between the first and second outer sleeve annular end surfaces 50a and 50b. As shown in FIG. 5 to 6, the body member 42, the inner sleeve 48 and the outer sleeve 50 are arranged relative to each other such that the respective ones of the first and second inner sleeve annular end surfaces 48a and 48b extend beyond respective ones of the first and second body member end surfaces 42a and 42b and beyond respective ones of the first and second outer sleeve annular end surfaces 50a and 50b.

For the first embodiment of the connector plug assembly 40 of the present invention, respective ones of the first and second threaded shafts 44 and 46 are connected to respective ones of the first and second body member end surfaces 42a and 42b. Also, the body member 42 is fabricated from a metal material such as steel or a steel alloy and the inner sleeve is fabricated from an electrically-conductive metal material such as copper or a copper alloy. It is noted that, particularly in view of FIGS. 9 and 10, the body member 42, the inner sleeve 48 and the outer sleeve 50 are considered in general as cylindrically shaped.

Figure 4:
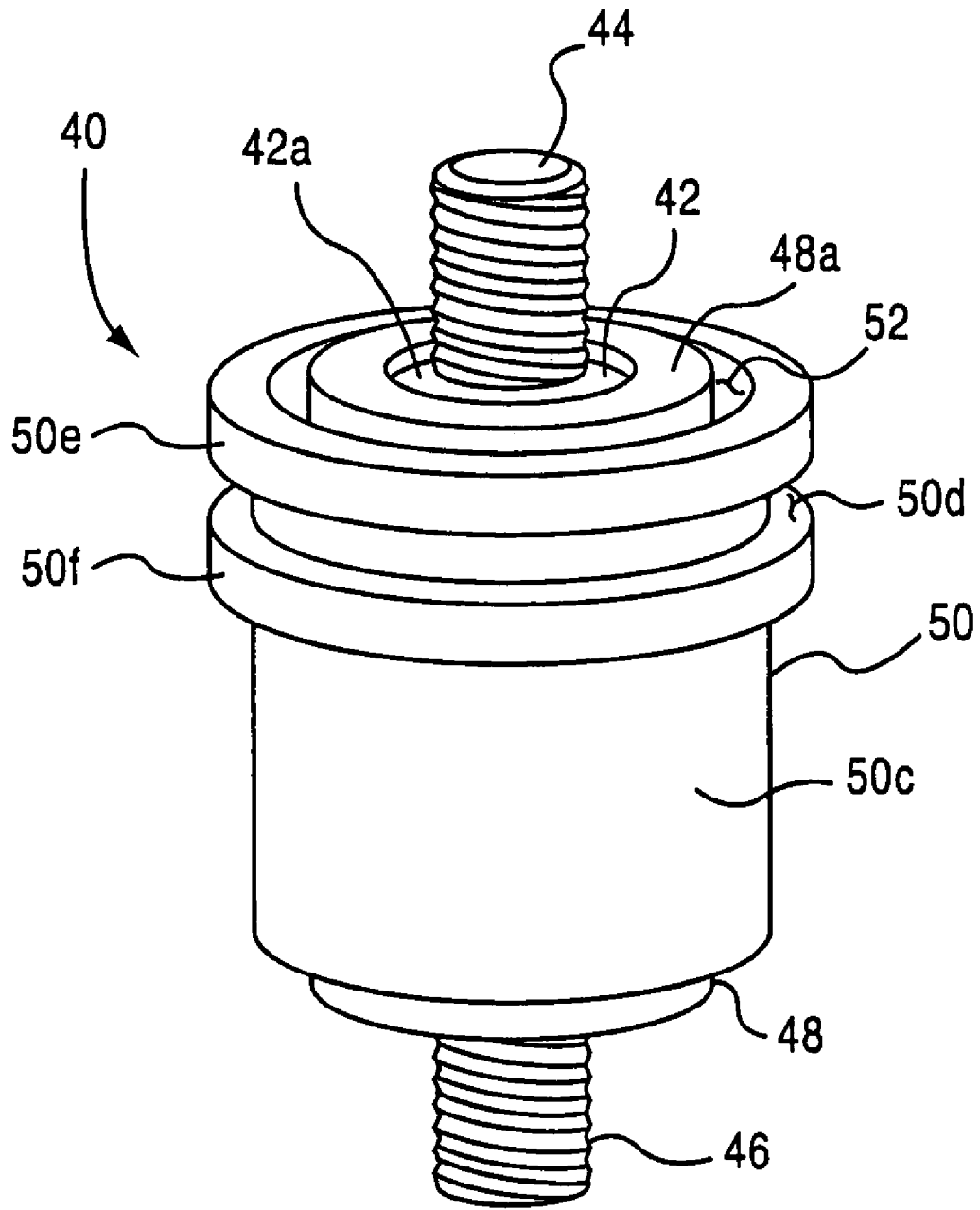
FIG. 4 is a perspective view on a first exemplary embodiment of a connector plug assembly of the present invention.
Figure 8:
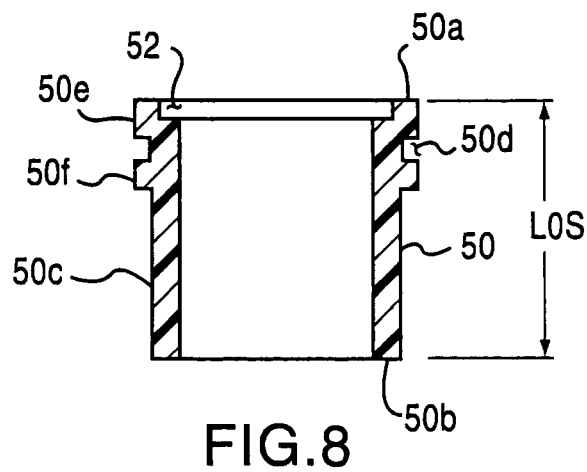
FIG. 8 is a cross-sectional view of an outer sleeve of the connector plug assembly shown in FIG. 4.

As illustrated in FIGS. 4, 5 and 8, the outer sleeve 50 has an outer sleeve outer surface 50c and includes an outwardly-facing circumferentially-extending groove 50d formed into the outer sleeve outer surface 50c. Also, the outer sleeve includes a first flange element 50e that is disposed at a distal end of the outer sleeve 50 and a second flange element 50f that is disposed apart from yet adjacent to the first flange element 50e. The outwardly-facing circumferentially-extending groove 50d is disposed between the first and second flange elements 50e and 50f. The first flange element 50e defines the first outer sleeve annular end surface 50a and forms an annular opening 52 into the outer sleeve 50 with the inner sleeve 48 as best shown in FIG. 5. The annular opening 52 commences at the first outer sleeve annular end surface 50a and extends into the outer sleeve 50.

Additionally, the connector plug assembly 40 of the present invention includes a female-threaded nut 54 sized and adapted to threadably engage at least one of the first and second threaded shaft portions 44 and 46. As illustrated in FIGS. 5 and 6, the female-threaded nut 54 threadably engages the first shaft portion 44.

Figure 11:
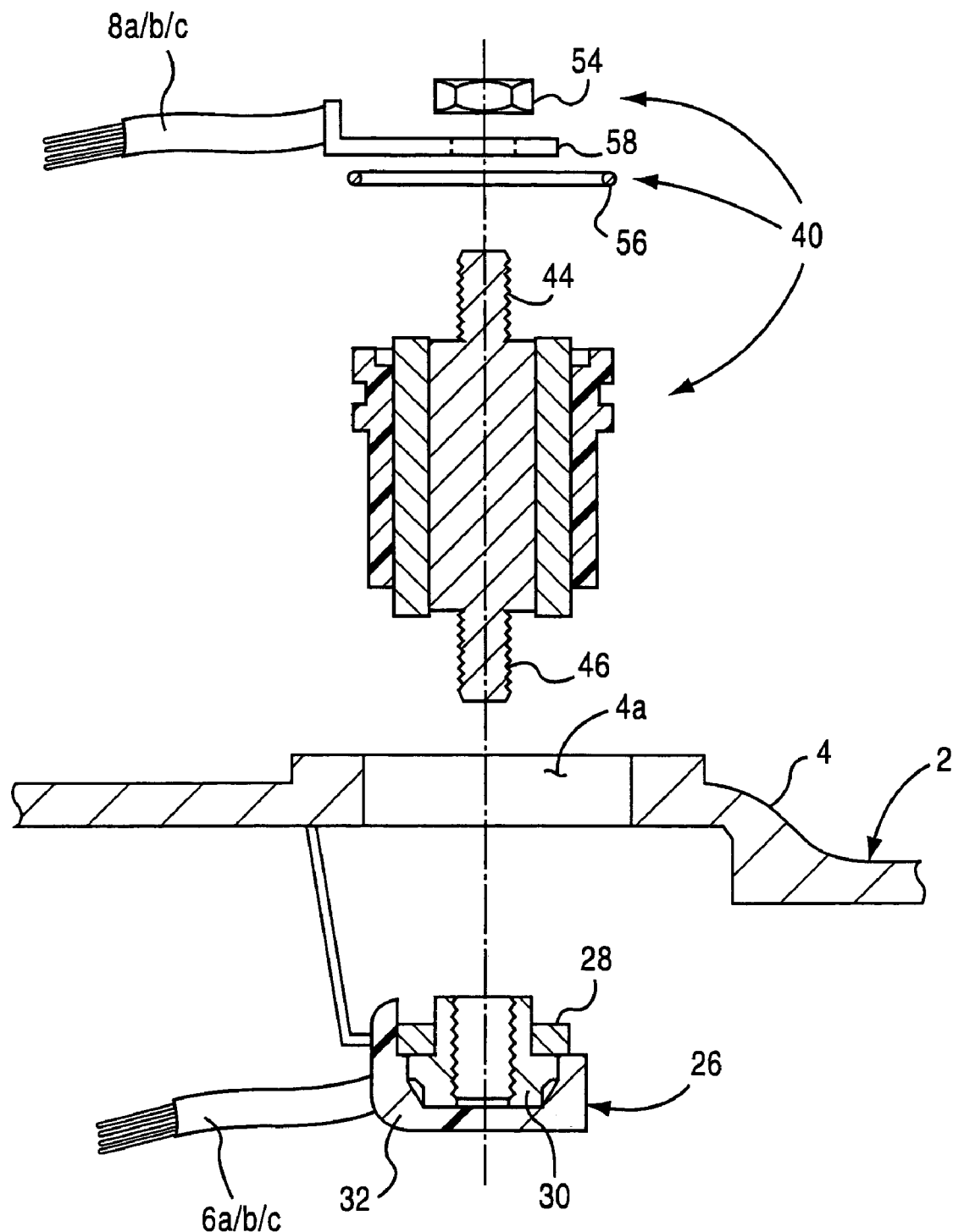
FIG. 11 is an exploded view of the connector plug assembly in FIG. 4 before being mounted to a casing of the conventional electric motor unit and before electrically connecting the internal and external high current electrical wires.
Figure 12:
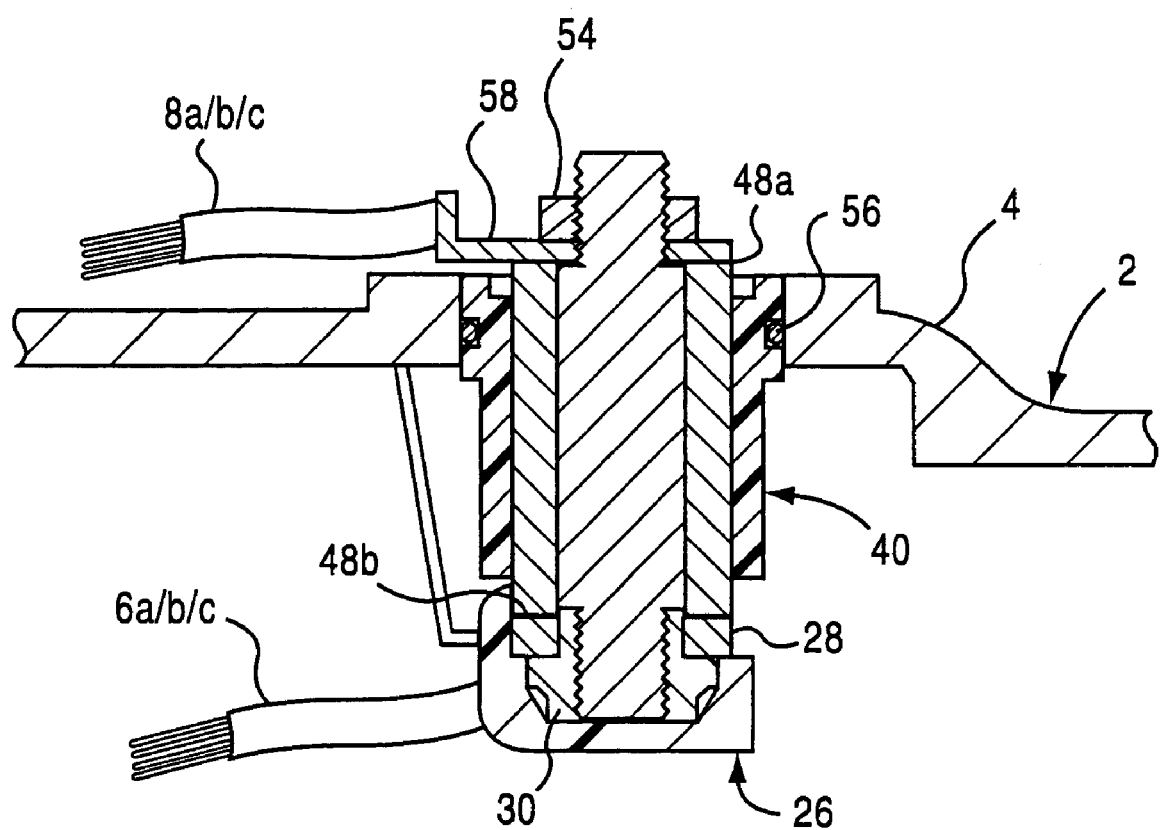
FIG. 12 is an exploded view of the connector plug assembly in FIG. 4 mounted to a casing of the conventional electric motor unit and electrically connecting the internal and external high current electrical wires.

Further, the connector plug assembly 40 of the present invention includes an outer sleeve seal 56 in a form of an O-ring as shown in FIGS. 11 and 12. The outer sleeve seal 56 is adapted to be received in the outwardly-facing circumferentially-extending groove 50d as best shown in FIG. 12. Also, FIGS. 11 and 12 illustrate how the connector plug assembly 40 is mounted onto the conventional casing 4 of the electric motor unit 2 and connected to the conventional terminal structure 26. The connector plug assembly 40 of the present invention is inserted into a casing opening 4a formed in the casing 4 of the electric motor unit 2. The second threaded shaft portion 46 and the terminal structure nut 30 are threadably engaged while the first and second flange elements 50e and 50f along with the outer sleeve seal 56 are disposed in the casing opening 4a and are in contact with the casing 4 itself. A conventional eyelet 58 electrically connected to the external high current electrical wire 8a/b/c is disposed about the first threaded shaft portion 44. The threaded nut 54 and the first threaded shaft portion 44 are threadably engaged with the conventional eyelet 54 disposed therebetween.

As best shown in FIG. 12, the first inner sleeve annular end surface 48a and the eyelet 58 make electrical contact with each other when the threaded nut 54 and the first threaded shaft portion 44 are threadably engaged. Also, the second inner sleeve annular end surface 48b and the washer-like electrode 28 make electrical contact with each other when the second threaded shaft portion 46 and the terminal structure nut 30 are threadably engaged. And, as described above, because the inner sleeve 48 is at least slightly longer than the body member 42 and the outer sleeve and because the inner sleeve 48 is preferably fabricated from copper or a copper alloy, electrical communication between the internal high current electrical wire 6a and the external high current electrical wire 8a is well established.

A second exemplary embodiment of a connector plug assembly 140 of the present invention is introduced in FIGS. 13-19. The connector plug assembly 140 includes an electrically-conductive inner sleeve 148, a shaft 60 and an electrically-insulative outer sleeve 150. The electrically-conductive inner sleeve 148 and the electrically-insulative outer sleeve 150 have similar features as the electrically-conductive inner sleeve 48 and the electrically-insulative outer sleeve 50 discussed above but also have distinguishing features therefrom as discussed below. The similar features are numbered identically as above and no further discussion is therefore deemed necessary.

Figure 15:
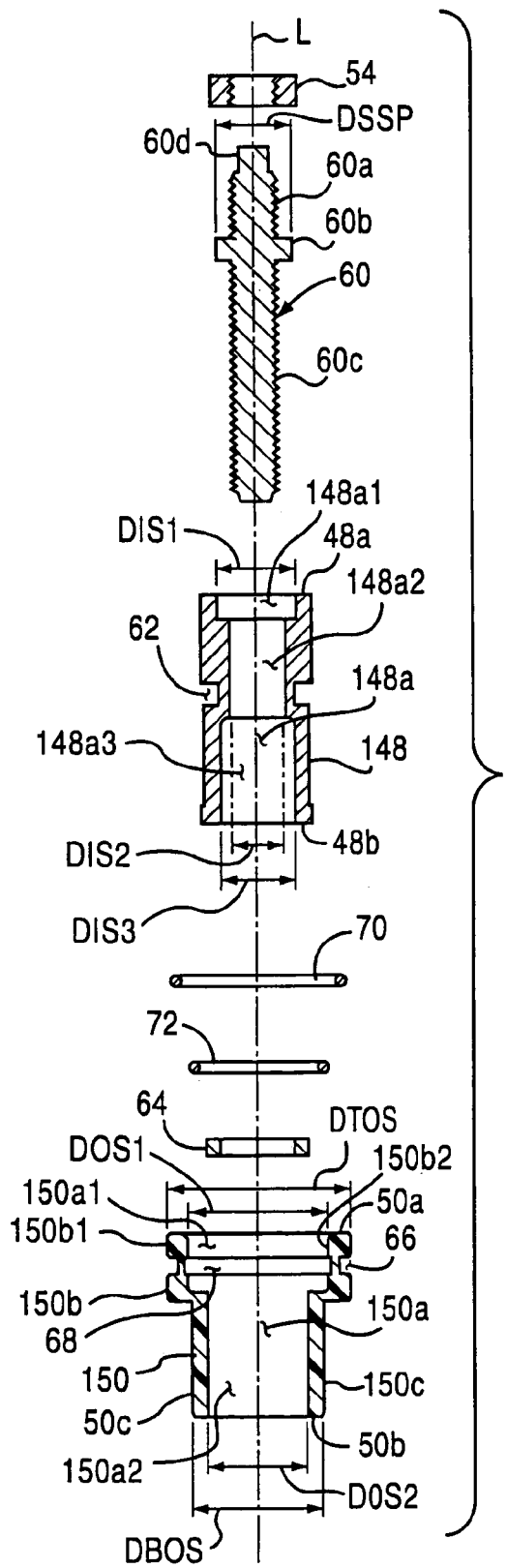
FIG. 15 is an exploded side elevational view in cross-section of the components of the connector plug assembly shown in FIG. 13.
Figure 16:
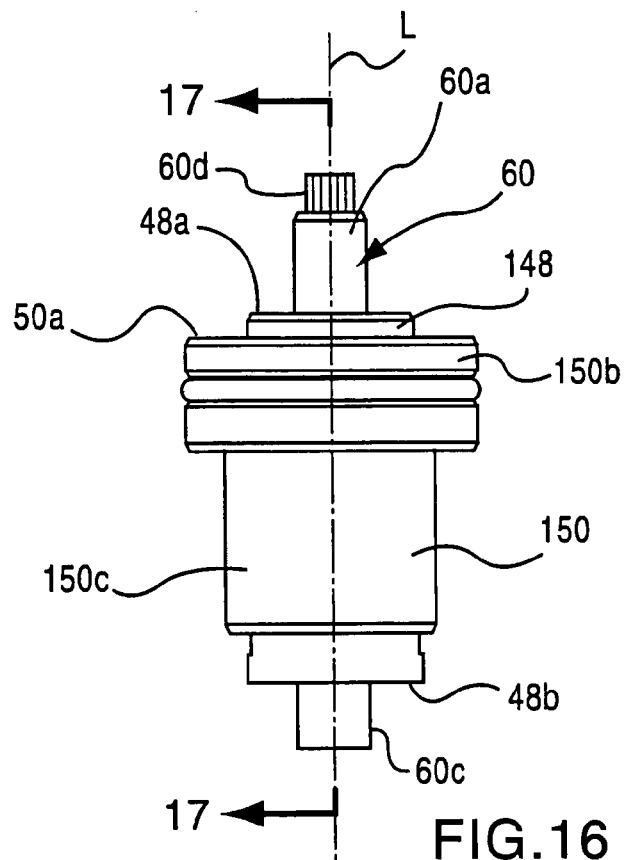
FIG. 16 is a side elevational view of the connector plug assembly shown in FIG. 13.

As best shown in FIG. 15, the inner sleeve 148 defines an inner sleeve through hole 148a that extends through and between the first and second inner sleeve annular end surfaces 48a and 48b along and about the longitudinal axis L. In FIG. 15, the inner sleeve through hole 148a has an first inner sleeve hole portion 148a1 with a first inner sleeve hole portion diameter DIS1, a second inner sleeve hole portion 148a2 with a second inner sleeve hole portion diameter DIS2 and a third inner sleeve hole portion 148a3 with a third inner sleeve hole portion diameter DIS3. The second inner sleeve hole portion 148a2 is disposed between the first and third inner sleeve hole portions 148a1 and 148a3 respectively. Also, the second inner sleeve hole portion 148a is unthreaded although it could be threaded. Further, the second inner sleeve hole portion diameter DIS2 is smaller than the first and third inner sleeve hole diameters DIS1 and DIS3 respectively.

Figure 14:
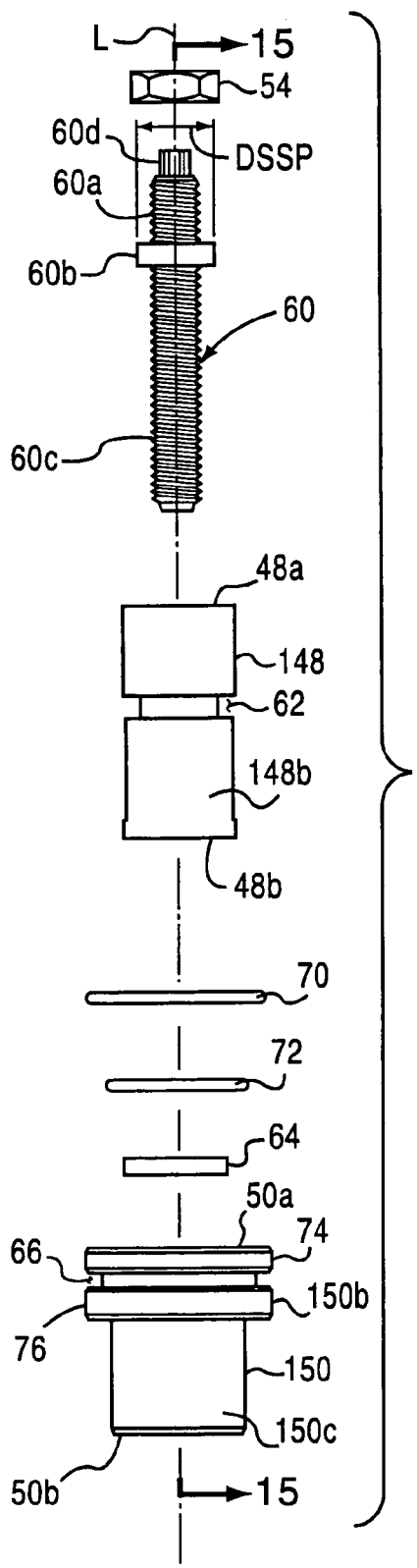
FIG. 14 is an exploded side elevational view of the components of the connector plug assembly shown in FIG. 13.
Figure 17:
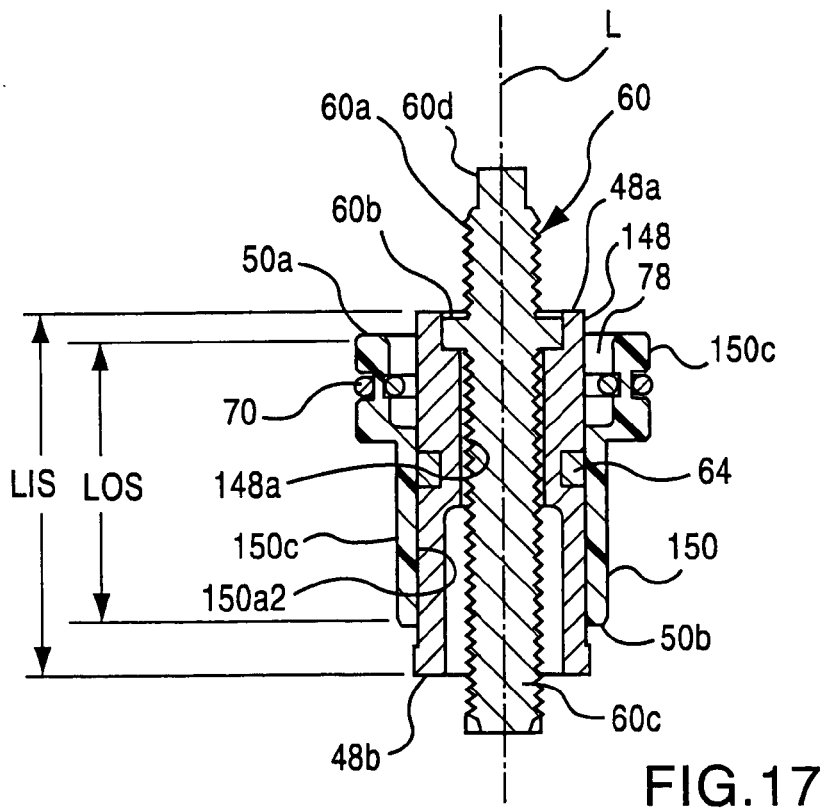
FIG. 17 is a side elevational view in cross-section of the connector plug assembly shown in FIG. 13.

In FIGS. 14 and 15, the shaft 60 which is generally cylindrically shaped extends along and about the longitudinal axis L and has a first shaft portion 60a, a second shaft portion 60b and a third shaft portion 60c. The second shaft portion 60b is disposed between the first and third shaft portions 60a and 60c respectively. The second shaft portion 60b extends radially outwardly relative to the longitudinal axis L and beyond the first and third shaft portions 60a and 60c forming a disk-like piece b between the first and third shaft portions 60a and 60c. The second shaft portion 60b is sized to be received by the first hole portion 148a1 as best shown in FIG. 17. As shown in FIGS. 14 and 15, the first and third shaft portions 60a and 60b are threaded and are therefore considered in the art as male threaded shafts. Note that the third shaft portion 60c is sized to threadably engage with the second inner sleeve hole portion 148a2 as best shown in FIG. 17. Also note that the second shaft portion has a second shaft portion diameter DSSP and that the second shaft portion diameter DSSP is larger than the second inner sleeve hole portion diameter DIS2.

With reference to FIGS. 14 and 15, the outer sleeve 150 extends along and about the longitudinal axis L. The outer sleeve 150 is connected to and surrounds the inner sleeve 150. In FIG. 15, the outer sleeve 150 defines an outer sleeve through hole 150a. The outer sleeve through hole 150 has a first outer sleeve through hole portion 150a1 having a first outer sleeve through hole diameter DOS1 and a second outer sleeve through hole portion 150a2 having a second outer sleeve through hole diameter DOS2. The second outer sleever through hole diameter DOS2 is less than the first outer sleeve through hole diameter DOS1. As best shown in FIG. 17, the second outer sleeve through hole portion 150a2 is sized to receive the inner sleeve 148 in a close-fitting, connected relationship.

Again, with reference to FIG. 17, when the third shaft portion 60c is threadably engaged with the second inner sleeve hole portion 148a and the second outer sleeve through hole portion 150a2 receives the inner sleeve 148 in the close-fitting, connected relationship, the first threaded shaft portion 60a projects longitudinally outwardly from the first inner sleeve annular end surface 48a and the outer sleeve 150 and the third threaded shaft portion 60c projects longitudinally outwardly from the second inner sleeve annular end surface 48b of the inner sleeve 148 and the outer sleeve 150.

As best shown in FIGS. 14 and 15, the inner sleeve 148 has an inner sleeve outer surface 148b and the inner sleeve 148 has an inner sleeve circumferentially extending groove 62 formed into the inner sleeve outer surface 148b. The inner sleeve circumferentially extending groove 62 surrounds the second inner sleeve hole portion 148a2 shown in FIG. 15. In FIGS. 14, 15 and 17, a first inner sleeve seal 64 is sized to be received by the inner sleeve circumferentially extending groove 62. Thus, when the second outer sleeve through hole portion 150a2 receives the inner sleeve 148 in a close-fitting, connected relationship, the first inner sleeve seal 64 contacts both the inner sleeve 148 and the outer sleeve 150.

Particularly with reference to FIGS. 14-17, the outer sleeve 150 has a top outer sleeve section 150b and a bottom outer sleeve section 150c. As best shown in FIG. 15, the top outer sleeve section 150b generally defines the first outer sleeve through hole portion 150a1. The bottom outer sleeve section 150c is integrally formed with the top outer sleeve section 150b and defines the second outer sleeve through hole portion 150a2. The top outer sleeve section 150b has a top outer sleeve diameter DTOS and the bottom outer sleeve section 150c has a bottom outer sleeve diameter DBOS that is smaller than the top outer sleeve diameter DBOS.

With reference to FIG. 15, the top outer sleeve section 150b has a top outer sleeve outer surface 150b1 and a top outer sleeve inner surface 150b2. The top outer sleeve inner surface 150b2 defines the first outer sleeve through hole portion 150a1. As shown in FIGS. 14 and 15, the top outer sleeve outer surface 150b1 has a first top outer sleeve groove 66 formed into the top outer sleeve outer surface 150b1 and extends circumferentially about the top outer sleeve outer surface 150b1. Furthermore, the top outer sleeve inner surface 150b2 has a second top outer sleeve groove 68 shown in FIG. 15. The second top outer sleeve groove 68 is formed into the top outer sleeve inner surface 150b2 and extends circumferentially about the top outer sleeve inner surface 150b2. As illustrated in FIGS. 14, 15 and 17, a first top outer sleeve O-ring 70 is sized to be received by the first top outer sleeve groove 66 and a second top outer sleeve O-ring 72 sized to be received by the second top outer sleeve groove.

Figure 13:
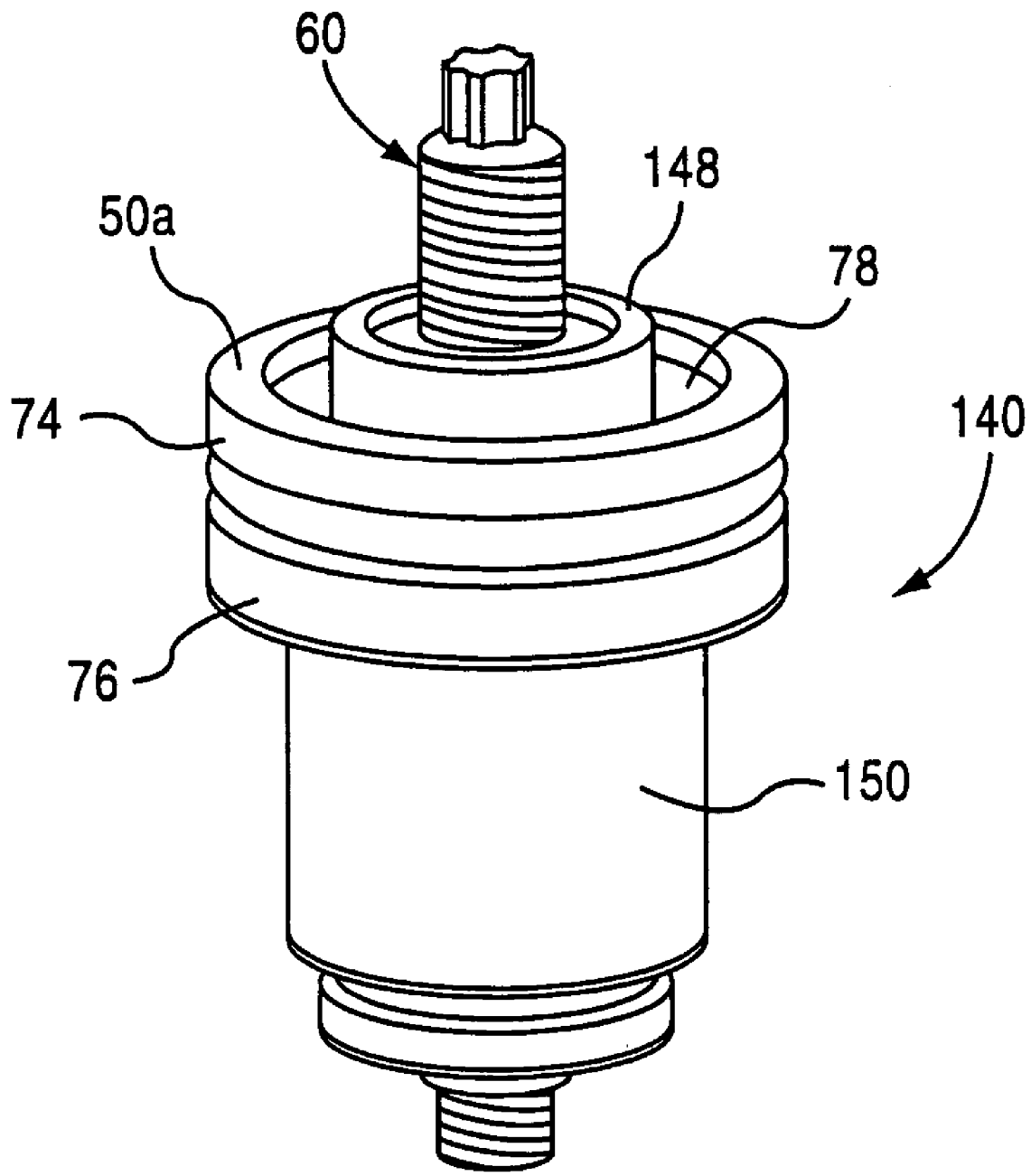
FIG. 13 is a perspective view of a second exemplary embodiment of a connector plug assembly of the present invention.

In FIGS. 13-17, the top outer sleeve section 150b of the outer sleeve 150 includes a first flange element 74 and a second flange element 76. The first flange element 74 is disposed at a distal end of the outer sleeve 150 and the second flange element 76 is disposed apart from yet adjacent to the first flange element 74. The first top outer sleeve groove 66 is disposed between the first and second flange elements 74 and 76 respectively. The first flange element 74 defines the first outer sleeve annular end surface 50a and forms an annular opening 78 into the outer sleeve 150 with the inner sleeve 148 as shown in FIGS. 13 and 17. The annular opening 78 commences at the first outer sleeve annular end surface 50a and extends into the outer sleeve 150.

Although not by way of limitation, the shaft 60 is fabricated from steel or a steel alloy and the inner sleeve 148 is fabricated from copper or a copper alloy.

Figure 18:
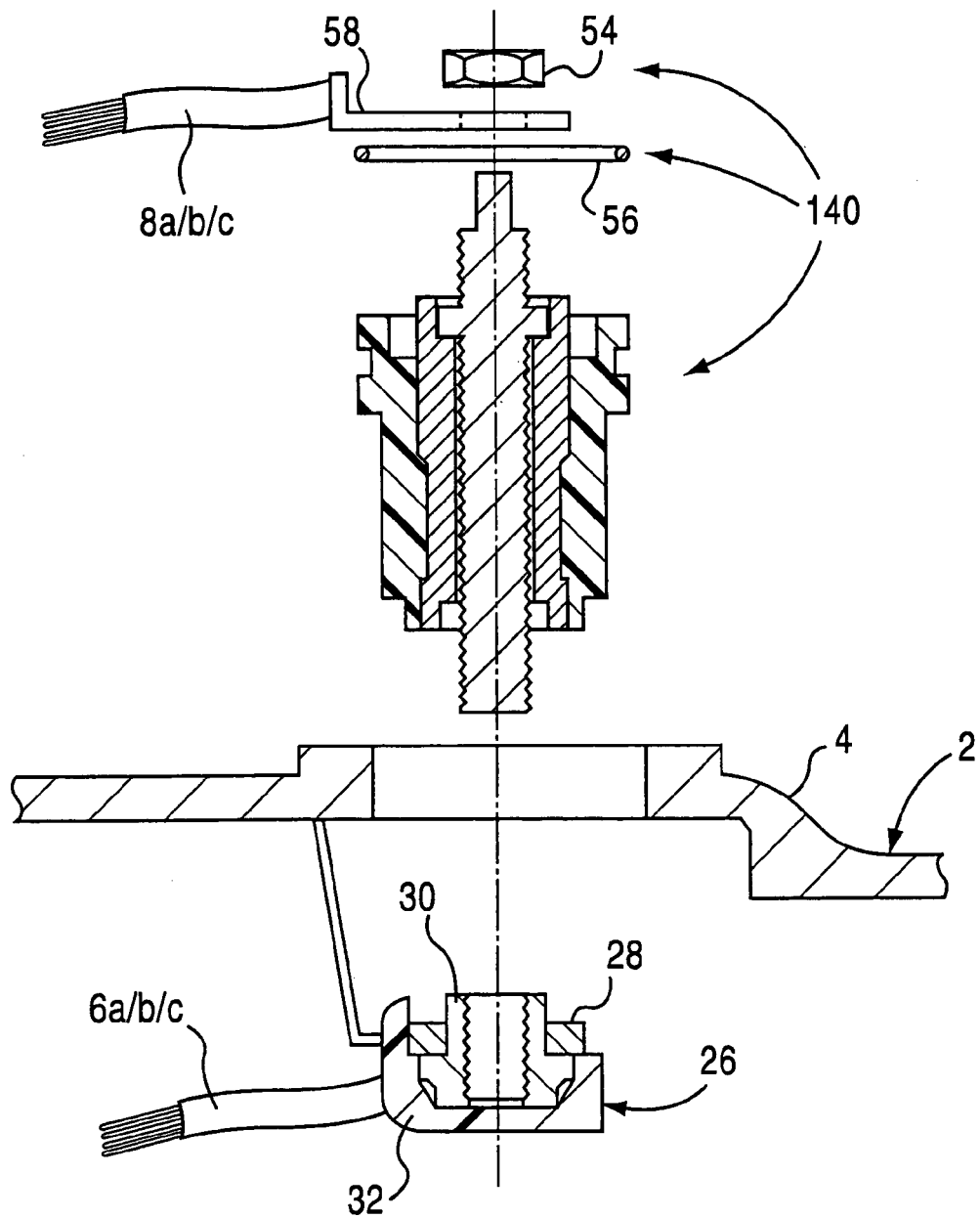
FIG. 18 is an exploded view of the connector plug assembly in FIG. 13 before being mounted to the casing of the conventional electric motor unit and before electrically connecting the internal and external high current electrical wires.
Figure 19:
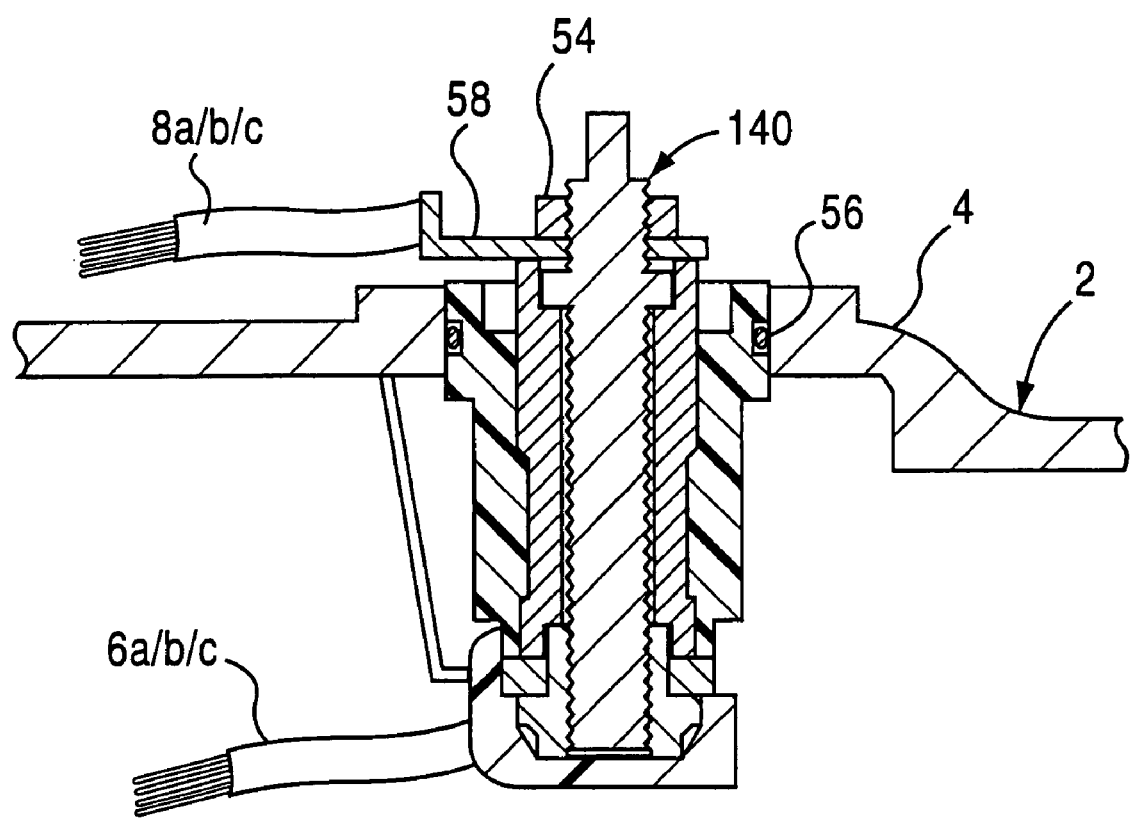
FIG. 19 is an exploded view of the connector plug assembly in FIG. 13 mounted to a casing of the conventional electric motor unit and electrically connecting the internal and external high current electrical wires.

In FIGS. 18 and 19, the connector plug assembly 140 is mounted to the casing 4 of the electric motor unit 2 and electrically connected to the terminal structure 26 and the external high current electrical wire 8a/b/c as similarly illustrated in FIGS. 11 and 12 for the connector plug assembly 40. As a result, no further explanation is deemed necessary.

Figure 20:
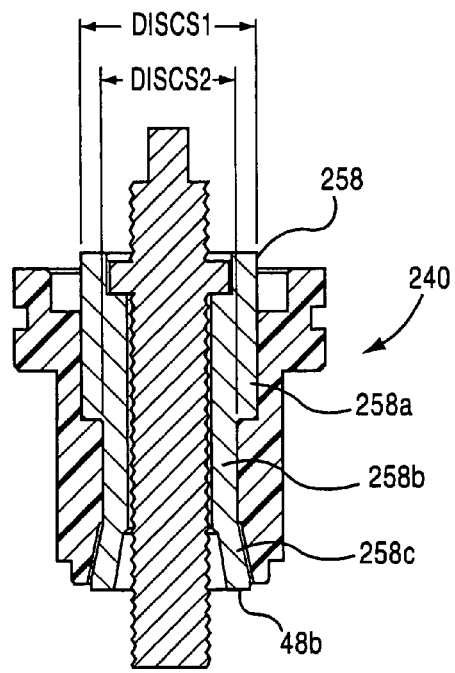
FIG. 20 is a side elevational view shown in cross-section of a third exemplary embodiment of the connector plug assembly of the present invention.

A third exemplary embodiment of a connector plug assembly 240 is introduced in FIG. 20. The connector plug assembly 240 is similar to the first and second embodiment of the connector plug assembly 40 and 140 described above. One specific difference is an inner sleeve 258 having a different configuration. Specifically, the inner sleeve 258 has a first inner sleeve cylindrical section 258a having a first inner sleeve cylindrical section diameter DISCS1, a second inner sleeve cylindrical section 258b having a second inner sleeve cylindrical section diameter DISCS2 that is smaller than the first inner sleeve cylindrical section diameter DISCS1. However, the first and second inner sleeve cylindrical sections 258a and 258b respectively are an integral construction.

Also, in FIG. 20, the inner sleeve 258 has an inner sleeve frustoconical section 258c integrally connected to the second inner sleeve cylindrical section 258b as an integral construction with the second inner sleeve cylindrical section 258b disposed between the first inner sleeve cylindrical section 258a and the inner sleeve frustoconical section 258c. The inner sleeve frustoconical section 258c defines an inner sleeve frustoconical hole portion 258c1 that tapers inwardly from the second inner sleeve annular end surface 48b.

Figure 22:
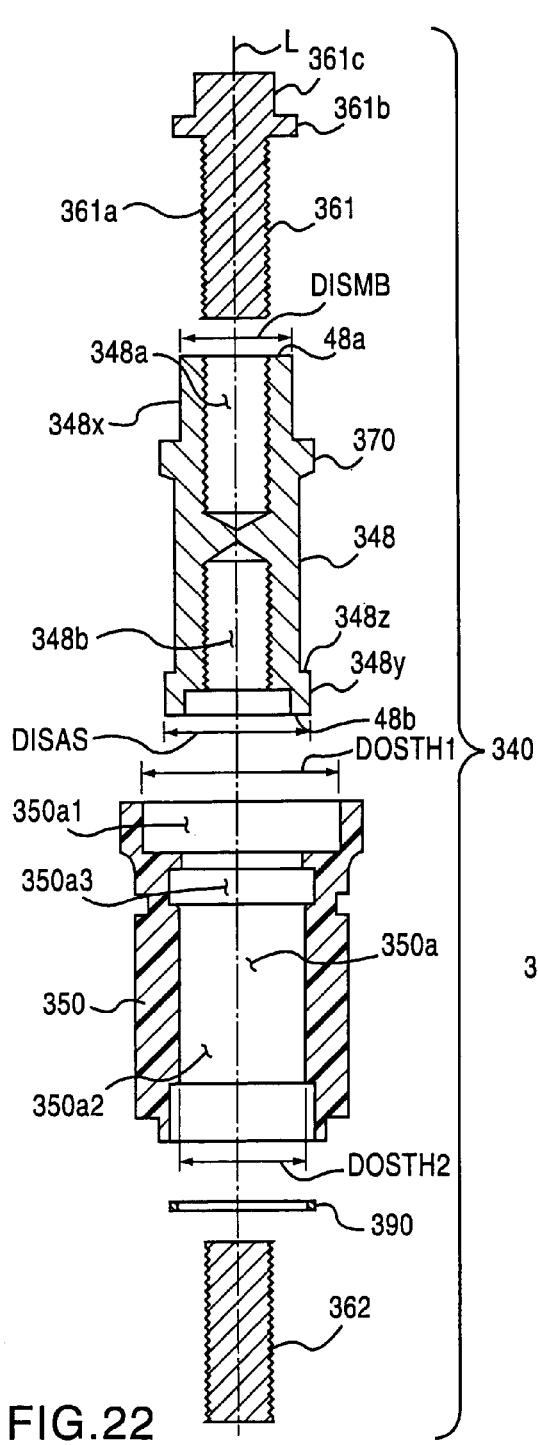
FIG. 22 is an exploded side elevational view shown in cross-section of the connector plug assembly in FIG. 21.
Figure 21:
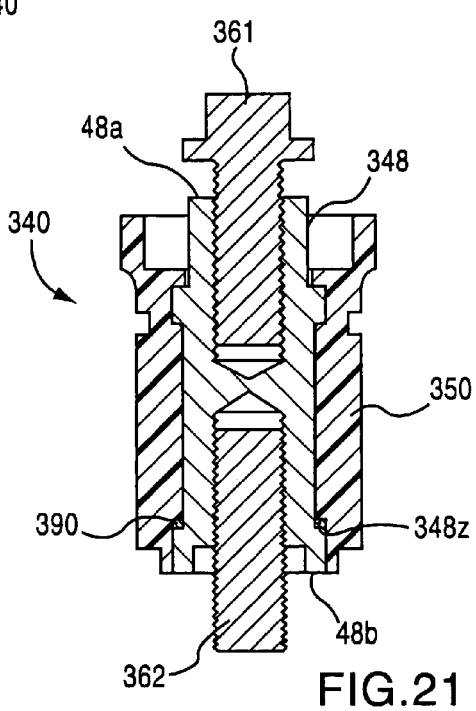
FIG. 21 is a side elevational view shown in cross-section of a fourth exemplary embodiment of the connector plug assembly of the present invention.

A fourth exemplary embodiment of a connector plug assembly 340 of the present invention is illustrated in FIGS. 21 and 22. The connector plug assembly 340 includes and electrically-conducted inner sleeve 348, a first shaft 361, a second shaft 362 and an electrically-insulative outer sleeve 350.

The inner sleeve 348 has a first threaded hole 348a that extends along and about the longitudinal axis L from the first inner sleeve annular end surface 48a and partially into the inner sleeve 348 and a second threaded hole 348b that extends along and about the longitudinal axis L from the second inner sleeve annular end surface 48b and partially into the inner sleeve 348.

The first shaft 361 has a first shaft threaded portion 361a and a head portion 361b that extends radially outwardly relative to the longitudinal axis and beyond the first shaft threaded portion 361a. The first shaft 361 also has a cap 361c connected to the head portion 361b. The first shaft threaded portion 361a is sized to be threadably engaged with the first threaded hole 348a. The second shaft 362 is threaded and is sized to be threadably engaged with the second threaded hole 348b.

The outer sleeve 350 is connected to and generally surrounds the inner sleeve. The outer sleeve 350 defines an outer sleeve through hole 350a. The outer sleeve through hole 350a has a first outer sleeve through hole portion 350a1 having a first outer sleeve through hole diameter DOSTH1 and a second outer sleeve through hole portion 350b2 having a second outer sleeve through hole diameter DOSTH2 that is less than the first outer sleeve through hole diameter DOSTH1. The second outer sleeve through hole portion 350b2 is sized to receive the inner sleeve in a close-fitting, connected relationship.

With reference to FIG. 21, when the first shaft threaded portion 361a is threadably engaged with the first threaded hole 348a, when the second shaft 362 is threadably engaged with the second threaded hole 348b and when the second outer sleeve through hole portion 350a receives the inner sleeve 348 in the close-fitting, connected relationship, the first shaft 361 with its head portion 361b projects longitudinally outwardly from the first inner sleeve annular end surface 48a and the second shaft 362 projects longitudinally outwardly from the second inner sleeve annular end surface 48b.

Also, for the fourth exemplary embodiment of the connector plug assembly 340, a retainer ring 370 is connected to and surrounds the inner sleeve 348. The retainer ring 370 is sized to be received by a third outer sleeve through hole 350a3 shown in FIG. 22 in a close-fitting relationship as shown in FIG. 21. Note that the third outer sleeve through hole 350a3 is disposed between the first and second outer sleeve through holes 350a1 and 350a2.

Further, as shown in FIG. 22, the inner sleeve 348 has an inner sleeve main body section 348x having an inner sleeve main body outer diameter DISMB and an inner sleeve annular section 348y having an inner sleeve annular outer diameter DISAS that is larger than the inner sleeve main body outer diameter DISMB. The inner sleeve main body section 348x and the inner sleeve annular section 348y are integrally connected together to form a step-down annular surface 348z. A step-down annular seal 390 is sized to surround the inner sleeve 348 and simultaneously contact the inner sleeve 348, the outer sleeve 350 and the step-down surface 348z to seal the connection between the outer sleeve 350 and the inner sleeve 348.

The present invention, may, however, be embodied in various different forms. For example, the features shown in one exemplary embodiment may be substituted for features shown in another exemplary embodiment. These various different forms should not be construed as limited to the exemplary embodiments set forth herein. Rather, these exemplary embodiments are provided so that this disclosure will be thorough and complete and will fully convey the scope of the present invention to those skilled in the art.

What is claimed is:

1. A connector plug assembly, comprising:
    a cylindrically-shaped body member extending centrally along and about a longitudinal axis and having a disk-shaped first body member end surface, an opposite disk-shaped second body member end surface and an a cylindrically-shaped outer surface extending longitudinally between the first and second body member end surfaces and disposed radially from the longitudinal axis;
    a cylindrically-shaped first threaded shaft portion connected to the body member and projecting from the first body member end surface longitudinally and centrally about the longitudinal axis and a cylindrically-shaped second threaded shaft portion connected to the body member and projecting from the second body member end surface longitudinally and centrally about the longitudinal axis;
    an annularly-shaped electrically-conductive inner sleeve extending along and centrally about the longitudinal axis, the inner sleeve connected to and surrounding the cylindrically-shaped outer surface of the body member; and
    an annularly-shaped electrically-insulative outer sleeve extending along and centrally about the longitudinal axis, the outer sleeve connected to and surrounding the inner sleeve.

2. A connector plug assembly according to claim 1, further comprising a female-threaded nut sized and adapted to threadably engage at least one of the first and second threaded shaft portions.

3. A connector plug assembly according to claim 1, wherein the body member has a body member length extending longitudinally between the first and second body member end surfaces, the inner sleeve has an inner sleeve length extending longitudinally and the outer sleeve has an outer sleeve length extending longitudinally, the inner sleeve length being longer than the body member length and the outer sleeve length.

4. A connector plug assembly according to claim 3, wherein the inner sleeve has a first inner sleeve annular end surface and an opposite second inner sleeve annular end surface, the inner sleeve length extending between the first and second inner sleeve annular end surfaces, the outer sleeve has a first outer sleeve annular end surface and an opposite second outer sleeve annular end surface, the outer sleeve length extending between the first and second outer sleeve annular end surfaces.

5. A connector plug assembly according to claim 4, wherein the body member, the inner sleeve and the outer sleeve are arranged relative to each other such that the respective ones of the first and second inner sleeve annular end surfaces extend beyond respective ones of the first and second body member end surfaces and beyond respective ones of the first and second outer sleeve annular end surfaces.

6. A connector plug assembly according to claim 1, wherein respective ones of the first and second body member end surfaces extend radially from the longitudinal axis and the first and second body member end surfaces define respective first and second planes disposed apart from and extending parallel to one another.

7. A connector plug assembly according to claim 1, wherein the outer sleeve has an outer sleeve outer surface and includes an outwardly-facing circumferentially-extending groove formed into the outer sleeve outer surface.

8. A connector plug assembly according to claim 7, wherein the outer sleeve includes a first flange element disposed at a distal end of the outer sleeve and a second flange element disposed apart from yet adjacent to the first flange element, the outwardly-facing circumferentially-extending groove disposed between the first and second flange elements.

9. A connector plug assembly according to claim 8, wherein the outer sleeve has a first outer sleeve annular end surface and an opposite second outer sleeve annular end surface, the first flange element defines the first outer sleeve annular end surface and forms an annular opening into the outer sleeve with the inner sleeve, the annular opening commencing at the first outer sleeve annular end surface and extending into the outer sleeve.

10. A connector plug assembly according to claim 1, wherein the body member is fabricated from steel or a steel alloy and the inner sleeve is fabricated from copper or a copper alloy.

11. A connector plug assembly, comprising:
an electrically-conductive inner sleeve extending along and about a longitudinal axis and having a first inner sleeve annular end surface and an opposite second inner sleeve annular end surface, the inner sleeve defining an inner sleeve through hole extending through and between the first and second inner sleeve annular end surfaces along and about the longitudinal axis, the inner sleeve through hole having an first inner sleeve hole portion with a first inner sleeve hole portion diameter, a second inner sleeve hole portion with a second inner sleeve hole portion diameter and a third inner sleeve hole portion with a third inner sleeve hole portion diameter, the second inner sleeve hole portion being disposed between the first and third inner sleeve hole portions and being threaded, the second inner sleeve hole portion diameter being smaller than the first and third inner sleeve hole diameters;
a shaft extending along and about the longitudinal axis and having a first shaft portion, a second shaft portion and a third shaft portion with the second shaft portion being disposed between the first and third shaft portions, the second shaft portion extending radially outwardly relative to the longitudinal axis and beyond the first and third shaft portions and sized to be received by the first hole portion, the first and third shaft portions being threaded, the third shaft portion sized to threadably engage with the second inner sleeve hole portion; and
an electrically-insulative outer sleeve extending along and about the longitudinal axis, the outer sleeve connected to and surrounding the inner sleeve, the outer sleeve defining an outer sleeve through hole with a first outer sleeve through hole portion having a first outer sleeve through hole diameter and a second outer sleeve through hole portion having a second outer sleeve through hole diameter being less than the first outer sleeve through hole diameter, the second outer sleeve through hole portion sized to receive the inner sleeve in a close-fitting, connected relationship,
wherein, when the third shaft portion is threadably engaged with the second inner sleeve hole portion and the second outer sleeve through hole portion receives the inner sleeve in the close-fitting, connected relationship, the first threaded shaft portion projects longitudinally outwardly from the first inner sleeve annular end surface and the outer sleeve and the third threaded shaft portion projects longitudinally outwardly from the second inner sleeve annular end surface of the inner sleeve and the outer sleeve.

12. A connector plug assembly according to claim 11, further comprising a female-threaded nut sized and adapted to threadably engage the first threaded shaft portion.

13. A connector plug assembly according to claim 11, wherein the inner sleeve, the shaft and the outer sleeve are generally cylindrical in shape.

14. A connector plug assembly according to claim 11, wherein the inner sleeve has an inner sleeve length extending longitudinally between the first inner sleeve annular end surface and the second inner sleeve annular end surface and the outer sleeve has an outer sleeve length extending longitudinally, the outer sleeve has a first outer sleeve annular end surface and an opposite second outer sleeve annular end surface, the outer sleeve length extending between the first and second outer sleeve annular end surfaces, the inner sleeve length being longer than the outer sleeve length.

15. A connector plug assembly according to claim 11, wherein the second shaft portion has a second shaft portion diameter, the second shaft portion diameter being larger than the second inner sleeve hole portion diameter.

16. A connector plug assembly according to claim 11, wherein the inner sleeve has an inner sleeve outer surface and an inner sleeve circumferentially extending groove formed into the inner sleeve outer surface.

17. A connector plug assembly according to claim 16, wherein the inner sleeve circumferentially extending groove surrounds the second inner sleeve hole portion.

18. A connector plug assembly according to claim 17, further comprising a first inner sleeve seal sized to be received by the inner sleeve circumferentially extending groove wherein, when the second outer sleeve through hole portion receives the inner sleeve in a close-fitting, connected relationship, the first inner sleeve seal contacts both the inner sleeve and the outer sleeve.

19. A connector plug assembly according to claim 16, wherein the outer sleeve has a top outer sleeve section generally defining the first outer sleeve through hole portion and a bottom outer sleeve section integrally formed with the top outer sleeve section and defining the second outer sleeve through hole portion, the top outer sleeve section having a top outer sleeve diameter and the bottom outer sleeve section having a bottom outer sleeve diameter being smaller than the top outer sleeve diameter.

20. A connector plug assembly according to claim 19, wherein the top outer sleeve section has a top outer sleeve outer surface and a top outer sleeve inner surface defining the first outer sleeve through hole portion, the top outer sleeve outer surface has a first top outer sleeve groove formed thereinto and extending circumferentially thereabout, the top outer sleeve inner surface has a second top outer sleeve groove formed thereinto and extending circumferentially thereabout.

21. A connector plug assembly according to claim 20, further comprising a first top outer sleeve O-ring sized to be received by the first top outer sleeve groove and a second top outer sleeve O-ring sized to be received by the second top outer sleeve groove.

22. A connector plug assembly according to claim 11, wherein the inner sleeve has a first inner sleeve cylindrical section having a first inner sleeve cylindrical section diameter, a second inner sleeve cylindrical section having a second inner sleeve cylindrical section diameter smaller than the first inner sleeve cylindrical section diameter, the first and second inner sleeve cylindrical sections being an integral construction.

23. A connector plug assembly according to claim 22, wherein the inner sleeve has an inner sleeve frustoconical section integrally connected to the second inner sleeve cylindrical section, the inner sleeve frustoconical section defining an inner sleeve frustoconical hole portion as tapering inwardly from the second inner sleeve annular end surface.

24. A connector plug assembly according to claim 11, wherein the outer sleeve has an outer sleeve outer surface and includes an outwardly-facing circumferentially-extending groove formed into the outer sleeve outer surface.

25. A connector plug assembly according to claim 24, wherein the outer sleeve includes a first flange element disposed at a distal end of the outer sleeve and a second flange element disposed apart from yet adjacent to the first flange element, the outwardly-facing circumferentially-extending groove disposed between the first and second flange elements.

26. A connector plug assembly according to claim 25, wherein the outer sleeve has a first outer sleeve annular end surface and an opposite second outer sleeve annular end surface, the first flange element defines the first outer sleeve annular end surface and forms an annular opening into the outer sleeve with the inner sleeve, the annular opening commencing at the first outer sleeve annular end surface and extending into the outer sleeve.

27. A connector plug assembly according to claim 11, wherein the shaft is fabricated from steel or a steel alloy and the inner sleeve is fabricated from copper or a copper alloy.

28. A connector plug assembly, comprising:
an electrically-conductive inner sleeve extending along and about a longitudinal axis and having a first inner sleeve annular end surface and an opposite second inner sleeve annular end surface, the inner sleeve having a first threaded hole extending along and about the longitudinal axis from the first inner sleeve annular end surface and partially into the inner sleeve and a second threaded hole extending along and about the longitudinal axis from the second inner sleeve annular end surface and partially into the inner sleeve;
a first shaft extending along and about the longitudinal axis and having a first shaft threaded portion and a head portion extending radially outwardly relative to the longitudinal axis and beyond the first shaft threaded portion, the first shaft threaded portion sized to be threadably engaged with the first threaded hole;
a second shaft extending along and about the longitudinal axis and being threaded, the second shaft sized to be threadably engaged with the second threaded hole; and
an electrically-insulative outer sleeve extending along and about the longitudinal axis, the outer sleeve connected to and surrounding the inner sleeve,
the outer sleeve defining an outer sleeve through hole with a first outer sleeve through hole portion having a first outer sleeve through hole diameter and a second outer sleeve through hole portion having a second outer sleeve through hole diameter being less than the first outer sleeve through hole diameter, the second outer sleeve through hole portion sized to receive the inner sleeve in a close-fitting, connected relationship,
wherein, when the first shaft threaded portion is threadably engaged with the first threaded hole, the second shaft is threadably engaged with the second threaded hole and the second outer sleeve through hole portion receives the inner sleeve in the close-fitting, connected relationship, the first shaft with the head portion projects longitudinally outwardly from the first inner sleeve annular end surface and the second shaft projects longitudinally outwardly from the second inner sleeve annular end surface.

29. A connector plug assembly according to claim 28, further comprising a retainer ring connected to and surrounding the inner sleeve, the retainer ring sized to be received by a third outer sleeve through hole in a close-fitting relationship, the third outer sleeve through hole being disposed between the first and second outer sleeve through holes.

30. A connector plug assembly according to claim 28, wherein the inner sleeve has an inner sleeve main body section having an inner sleeve main body outer diameter and an inner sleeve annular section having an inner sleeve annular outer diameter being larger than the inner sleeve main body outer diameter, the inner sleeve main body section and the inner sleeve annular section being integrally connected together to form a step-down annular surface.

31. A connector plug assembly according to claim 30, further comprising a step-down annular seal sized to surround the inner sleeve and simultaneously contact the inner sleeve, the outer sleeve and the step-down surface.

* * * * *